(No Model.)
G. L. WILEY & E. G. ACHESON.
JOINT FOR ELECTRIC CONDUCTORS.
No. 433,920. Patented Aug. 5, 1890.
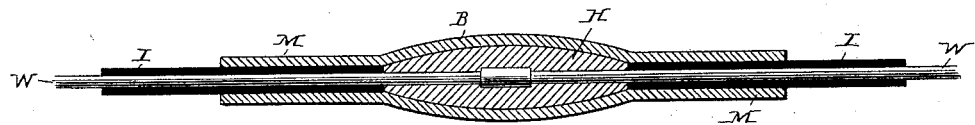
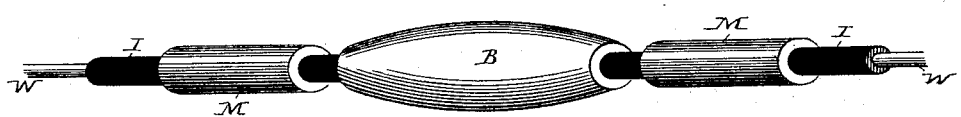
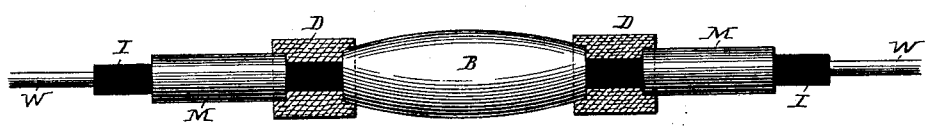

UNITED STATES PATENT OFFICE.

GEORGE L. WILEY, OF ARLINGTON, NEW JERSEY, AND EDWARD G. ACHESON, OF PITTSBURG, PENNSYLVANIA, ASSIGNORS TO THE STANDARD UNDERGROUND CABLE COMPANY, OF PITTSBURG, PENNSYLVANIA.

JOINT FOR ELECTRIC CONDUCTORS.

SPECIFICATION forming part of Letters Patent No. 433,920, dated August 5, 1890.

Application filed March 27, 1890. Serial No. 345,569. (No model.)

*To all whom it may concern:*

Be it known that we, GEORGE L. WILEY and EDWARD G. ACHESON, citizens of the United States, residing, respectively, at Arlington, in the county of Hudson and State of New Jersey, and at Pittsburg, in the county of Allegheny and State of Pennsylvania, have invented certain new and useful Improvements in Joints for Electric Conductors, of which the following is a specification.

The object of our invention is to provide means for procuring better insulation in metallic covered electric conductors at all points or places where joints and cut-out connections are made. It is well known that the greater part of the difficulties in obtaining high values of insulation in such cables and conductors, especially when charged with high-tension currents, is due to the leakages at the above-mentioned points, resulting either from the introduction of moisture, the porosity of the insulating metal, or accidental metal contacts. To obviate these troubles and insure insulation, great care and much labor are expended upon these joints, entailing great expense, and in order to avoid these objections and at the same time produce the required high insulation, we have made use of the invention hereinafter described, and illustrated in the accompanying drawings.

In said drawings, Figure 1 is a cross sectional view of a joint, such as has heretofore been made. Fig. 2 is a perspective view illustrating one of the steps in carrying out our improved insulation, and Fig. 3 of a cable connected according to our invention.

Referring more especially to Fig. 1, W W represents the metallic electric conductor, which may be of any desired form, either a solid conductor or made up of a number of strands, and I represents the insulation surrounding said conductor, which may be of any desired material capable of carrying the desired currents without danger of leakage. M is the outside cable, usually in the form of a lead tube or coating. The ends of the conductors W usually project a short distance beyond the insulating material and outside the lead coating, and are electrically connected in any suitable manner, as by soldering or otherwise. The space between the adjacent ends of the cable is then usually covered with some insulating material H, in the form of a plastic mass, and the joint completed by coating or covering this material with lead B, usually in what is known as a "wiped joint." While this kind of a joint is found effectual in many cases, we have found by practical experience that in the use of conductors carrying high-tension currents it is not at all satisfactory, as the least tendency to leak, due to any cause, lowers the insulating efficiency of the whole line very greatly.

The primary object of our invention is to interrupt the electrical connection between any portion of the lead covering that may be electrically connected with the inclosed conductor, and the other and remaining portions of the said lead covering situated on the two sides of the connected portion. It is immaterial how the electrical connection between the conductor and the lead covering may be formed, and whether on the one side or the other of the joint or at the joint itself, the object being to thoroughly insulate and separate that portion, if any, that may be connected electrically to the incased conductor. Thus the lead cover of our joint is insulated from the body of the covering of the cable on both sides, and the insulation of the joint is thereby greatly increased and the grounding of a conductor that might accidentally come into contact with the sleeve of the joint is prevented.

In our improved construction the ends of the conductors W W are joined in the usual way, and the space between the ends of the insulating material surrounding the conductor and the lead cover is filled with some insulating material which is free from pores and moisture and is covered with a metallic, preferably lead-coating B, either in the shape of a pipe-section or by applying fused metal. We then remove from each end of the conductor the outside metallic coating for a short space at each side of the joint, and, taking precautions to see that the parts are thoroughly dry and that there are no metallic connections between the conductor and the outside cover, we apply to the spaces thus formed on each side of the joint insulating material D, such as tape and asphaltum, or other equivalent fibrous material, and bind the same carefully and closely around the cable-core, filling up the spaces between the ends of the cable and the joint, and then extending the insulating material beyond the ends onto the adjacent lead covering of the cable and core. In this way we have found by actual practice that we can thoroughly insulate these portions of the conductors and produce a joint having a high efficiency of insulation, and can thereby maintain the whole line of conductors free from leakages of all sorts. We have further found that this arrangement is cheap, simple, and effective, and prevents the destruction of the joint from exposure to moisture, or other destroying elements.

What we claim as our invention is—

1. A joint for electric cables in which the conductors are united and surrounded with insulating material and covered with a protective metallic coating, and spaces at each side of said coating are filled with insulating material, substantially as described.

2. A joint for electric conductors in which the conductors are joined and surrounded with insulating material covered with a metallic coating, and having spaces at each end of the joint free from metallic coating, the said spaces being filled with insulating material overlapping the adjacent ends of the metallic coverings, substantially as described.

3. A joint for electric conductors in which the conductors are united and covered with insulating material surrounded by a metallic coating, and having sections of the metal coating of the cable removed at each end of the joint and the intervening spaces filled with fibrous insulating material overlapping the adjacent ends of the metal coating, substantially as described.

In testimony whereof we have signed our names to this specification in the presence of two subscribing witnesses.

GEORGE L. WILEY.
EDWARD G. ACHESON.

Witnesses:
THOS. F. O'CONNOR,
W. D. UPTEGRAFF.